US008360123B2

(12) United States Patent

Fukui et al.

(10) Patent No.: US 8,360,123 B2

(45) Date of Patent: Jan. 29, 2013

(54) TAG LABEL PRODUCING APPARATUS

(75) Inventors: Tomoyasu Fukui, Inuyama (JP); Tsuyoshi Nagae, Kasugai (JP); Kiyoichi Ohta, Chiryu (JP); Hitomi Hioki, Nagoya (JP); Shintaro Tomita, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 155 days.

(21) Appl. No.: 12/221,249

(22) Filed: Jul. 31, 2008

(65) Prior Publication Data

US 2009/0032193 A1 Feb. 5, 2009

(30) Foreign Application Priority Data

Aug. 3, 2007 (JP) ................................ 2007-202661

(51) Int. Cl.
*B32B 41/00* (2006.01)

(52) U.S. Cl. .......... 156/350; 156/64; 156/351; 156/352; 156/378; 156/379

(58) Field of Classification Search .................... 156/64, 156/350, 351, 352, 378, 379
See application file for complete search history.

(56) References Cited

U.S. PATENT DOCUMENTS

| | | | | |
|---|---|---|---|---|
| 2006/0202800 | A1 | 9/2006 | Ohashi et al. | |
| 2007/0172290 | A1* | 7/2007 | Nagae et al. | 400/613 |
| 2008/0053617 | A1* | 3/2008 | Nishigawa et al. | 156/378 |
| 2009/0319072 | A1* | 12/2009 | Fukui et al. | 700/110 |

FOREIGN PATENT DOCUMENTS

| | | | |
|---|---|---|---|
| EP | 1801733 | A1 | 6/2007 |
| JP | 2005-165880 | | 6/2005 |
| JP | 2006-309557 | | 11/2006 |
| JP | 2007-021732 | | 2/2007 |
| WO | 2006/059671 | A1 | 6/2006 |
| WO | 2006/059732 | | 6/2006 |
| WO | WO 2006059732 | A1 * | 6/2006 |
| WO | WO 2006/112467 | | 10/2006 |
| WO | 2007/007738 | A1 | 1/2007 |
| WO | 2008/038633 | A1 | 4/2008 |

* cited by examiner

*Primary Examiner* — Katarzyna Wyrozebski Lee
*Assistant Examiner* — Joshel Rivera
(74) *Attorney, Agent, or Firm* — McCarter & English, LLP

(57) ABSTRACT

This disclosure discloses a tag label producing apparatus comprising: at least one feeding roller; a printing device; and an apparatus antenna; and a coordination control portion that controls in coordination the feeding roller, the printing device, and the apparatus antenna, such that information transmission/reception is performed between an RFID circuit element and the apparatus antenna when an IC circuit part of the RFID circuit element provided to a tag medium is fed downstream in a transport direction from a segment from a nearest roller to the apparatus antenna along a feeding path.

9 Claims, 14 Drawing Sheets

TAG LABEL PRODUCING APPARATUS

CROSS-REFERENCE TO RELATED APPLICATIONS

This application claims priority from JP 2007-202661, filed Aug. 3, 2007, the contents of which are hereby incorporated by reference.

BACKGROUND

1. Field

The present disclosure relates to a tag label producing apparatus that produces RFID labels comprising RFID circuit elements capable of transmitting and receiving information through wireless communication.

2. Description of the Related Art

RFID (Radio Frequency Identification) systems that perform reading/writing between a compact RFID tag and a reader/writer (reading/writing apparatus) in a non-contact manner are known. For example, an RFID circuit element provided to a label-shaped RFID tag (RFID label) comprises an IC circuit part that stores predetermined RFID tag information, and a tag antenna that is connected to the IC circuit part and transmits and receives information. With such an arrangement, the reader/writer can access (read/write) the RFID tag information in the IC circuit part even if the RFID tag has become dirty or is arranged in a position where it cannot be seen. Such a technique has been put into practical use in a variety of fields such as asset management, office document control, breast pocket area nametags, and the like.

One such tag label producing apparatus configured to produce an RFID label having the above various usages is the apparatus described in JP, A, 2006-309557, for example. With a tag label producing apparatus according to this prior art, a tag tape in which RFID circuit elements are disposed in a tape-length direction at substantially equal intervals is wound in a roll shape and loaded. The tag tape is transported from the tag tape roll via feeding roller and is bonded by a pressure roller with a print-receiving tape on which desired printing is performed by printing device, thereby forming a tag label tape with print. Alternately, if no bonding is performed, printing is performed by the printing device onto the tag tape comprising the RFID circuit elements, thus forming the tag label tape with print. After information transmission/reception is performed with the RFID circuit elements provided to the tag label tape with print, the tag label tape with print is cut to a desired length, thus RFID labels with print are continuously produced.

As shown in the prior art, in general with a tag label producing apparatus, a pressing force acts upon the tag tape comprising the RFID circuit elements by the feeding rollers, pressure rollers, and so on when transporting the tape and so on. When printing on the tag tape with the printing device, pressing force acts upon the tag tape by a platen roller disposed opposite a print head, which is the printing device.

Accordingly, in the RFID circuit elements provided to the tag tape, the IC circuit part and the tag antenna are ordinarily joined as described above. When the pressing force of the rollers acts upon the contact point where they are joined, the contact point is also pressed and endures pressure during the short time of the pressing. After passing the rollers and the pressing force no longer acts upon it, the contact point is released from the pressure, and returns to its original shape gradually because of its inherent elastic restoring force and the like. Before wireless communication is performed, if sufficient time has passed after the last time when the roller (nearest roller) has passed through, the contact has returned to its original shape because of its restoring force and so on. However, in a case in which wireless communication is performed before sufficient time has passed since passing through the nearest roller, the effects of the pressing force on the contact of the RFID circuit element have not disappeared, and there is a risk of a drop in reliability and stability of communication due to some kind of residual effects on the communication characteristics. With the prior art described above, particularly little consideration has been given to the adverse effects by the pressing force on the communication characteristics of the RFID circuit elements during tag label production in this way.

SUMMARY

An object of the present disclosure is to provide a tag label producing apparatus capable of improving reliability and stability of communication during RFID label production.

In order to achieve the object, an aspect of the present application is a tag label producing apparatus comprising: at least one feeding roller that feeds a tag medium including an RFID circuit element comprising an IC circuit part that stores information and a tag antenna that transmits and receives information; a printing device that performs desired printing on the tag medium or on a print-receiving medium bonded thereto; and an apparatus antenna located downstream from the printing device in a transport direction along a feeding path of the feeding roller, that transmits and receives information to and from the RFID circuit element by wireless communication; wherein: the feeding roller includes a nearest roller located at a substantially same position in the transport direction as the printing device along the feeding path, or located downstream from the printing device in the transport direction, the nearest roller being closest to the apparatus antenna, the tag label producing apparatus further comprises a coordination control portion that controls in coordination the feeding roller, the printing device, and the apparatus antenna, such that the information transmission/reception is performed between the RFID circuit element and the apparatus antenna when the IC circuit part of the RFID circuit element provided to the tag medium is fed downstream in the transport direction from a segment from the nearest roller to the apparatus antenna along the feeding path.

When providing the RFID circuit element to the tag medium, in general, an IC circuit part and a tag antenna connected to the IC circuit part are provided in a laminated structure including a tape-like or sheet-like substrate, an adhesive agent, and the like. Since a contact point between the IC circuit part and the tag antenna is present in the laminated structure, it is preferable to perform communication with no external pressing force applied to the laminated structure including the contact point, from the point of view of ensuring reliability and stability of communication.

Accordingly, in the aspect of present disclosure, a segment from the nearest roller closest to the apparatus antenna to the apparatus antenna is defined among the feeding rollers at which there is a possibility that pressing force might be applied to the contact point. The coordination control portion controls the feeding roller, the printing device, and the apparatus antenna such that communication is performed between the apparatus antenna and the RFID circuit element once the IC circuit part of the RFID circuit element is downstream of the defined segment in the transport direction.

It is thus possible to perform communication between the apparatus antenna and the RFID circuit element after the contact point between the IC circuit part and the tag antenna has been subjected to the pressing force by the last nearest roller (before communication), and after the effects of the pressing force by the nearest roller have disappeared as sufficient time has passed. Accordingly, it is possible to improve the reliability and stability of communication during production of RFID labels and prevent occurrences of communication errors.

BRIEF DESCRIPTION OF THE DRAWING

FIG. 8A shows a top view, and FIG. 8B shows a bottom view.

FIG. 11 are schematic views showing a positional relationship among components around an apparatus antenna in a tag label producing apparatus of the present embodiment.

DETAILED DESCRIPTION OF THE PREFERRED EMBODIMENTS

An embodiment of the present disclosure is described below with reference to the drawings.

Figure 1:
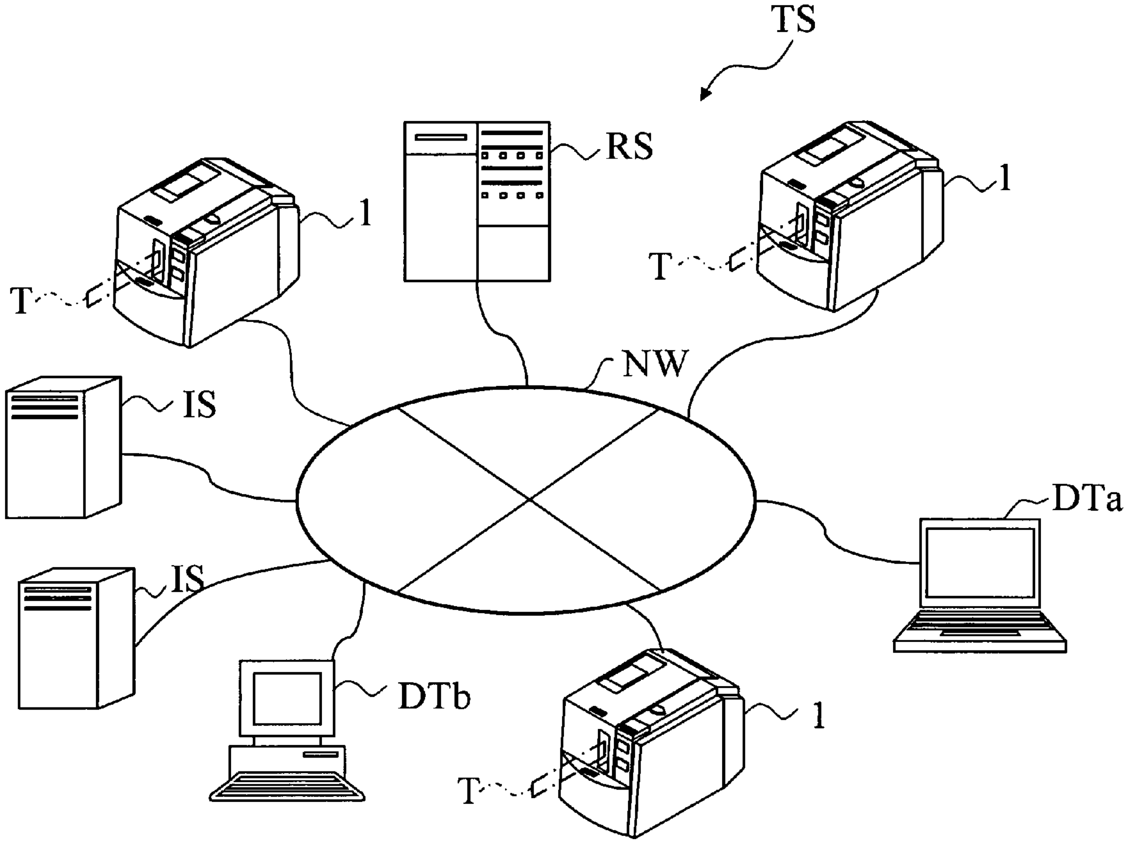
FIG. 1 is a view showing a constitution of an RFID label system comprising a tag label producing apparatus according to one embodiment of the present disclosure.

In this RFID label system TS shown in FIG. 1, the tag label producing apparatus 1 according to the present embodiment is connected to a root server RS, an information server IS, a terminal device DTa, a general purpose computer DTb, and so on, via a communication network NW made up of appropriate communication lines and so on.

Figure 2:
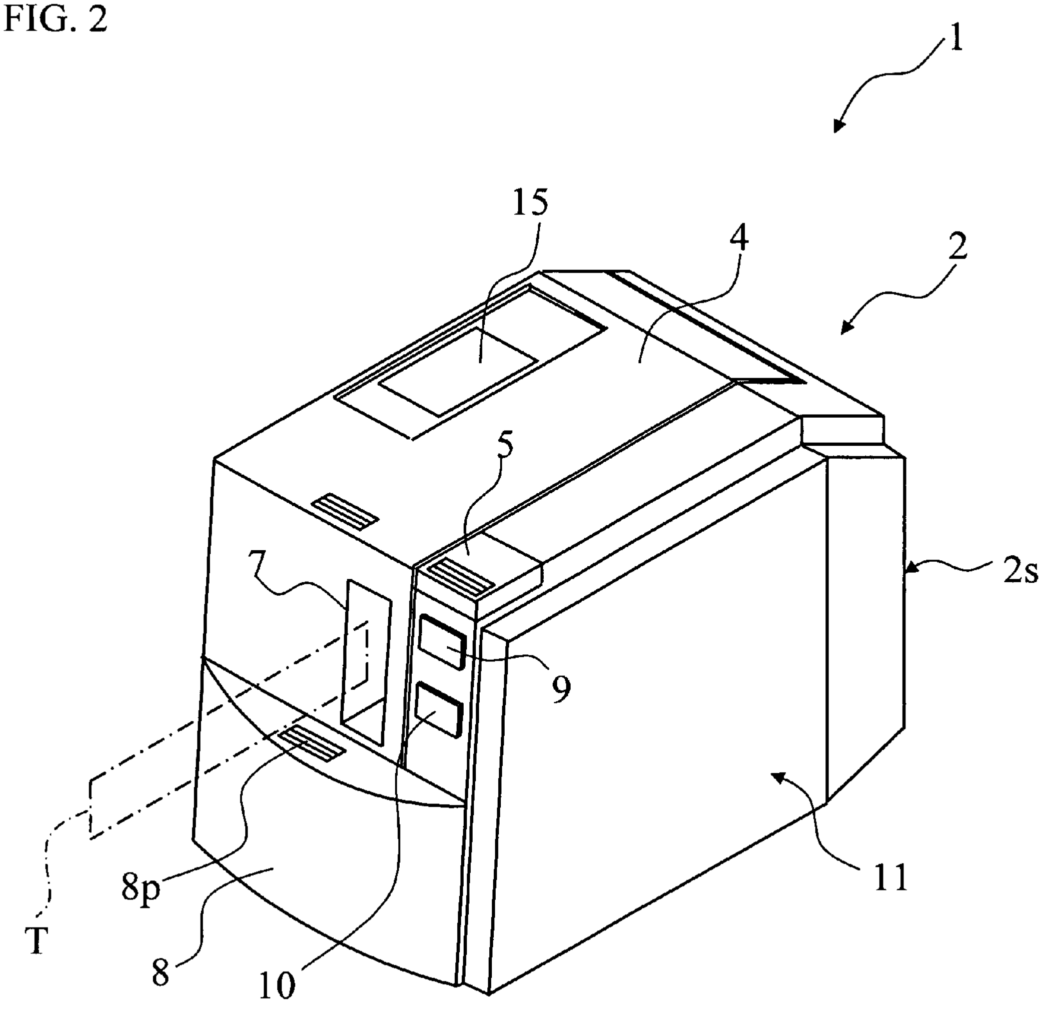
FIG. 2 is a perspective view showing an external constitution of a tag label producing apparatus.

As shown in FIG. 2, an apparatus body 2 (comprising a top face part, a bottom face part, a front fact part, a rear face part, and left and right side parts) of the tag label producing apparatus 1 is provided with an overall rectangular cubical housing 2*s* as an outer shell. A top lid 4 and a top lid manipulating button 5 are provided to the top face part. A label discharge opening 7, a front lid 8, a power button 9, and a cutter driving button 10 are provided to the front face part.

The top lid 4 is rotatably supported at a right back edge in FIG. 2 of the apparatus body 2, and is biased in an opening direction by a biasing member not showing in the drawing, while being lockably constituted with the apparatus body 2. When attaching or removing a cartridge (not particularly shown in the drawings) that comprises a tag tape roll described below, the lock is released by pressing the top lid manipulating button 5, the top lid 4 opens due to the biasing action of the biasing member, in this state allowing the loading or removal of the cartridge. A transparent window 15 into which is fit a transparent cover or the like is provided to the top lid 4.

The label discharge opening 7 discharges to the exterior RFID labels T produced inside the apparatus body 2. The front lid 8 can be opened and closed by rotating around a bottom edge, and rotates open in a forward direction by pushing up on a pushing part 8*p* provided to a top edge. The power button 9 is used to turn a main power supply to the tag label producing apparatus 1 on and off. The cutter driving button 10 is for making a length of an RFID label T a desired length, by the operator manually operating a full cutter 51 described below (see FIG. 3).

Figure 3:
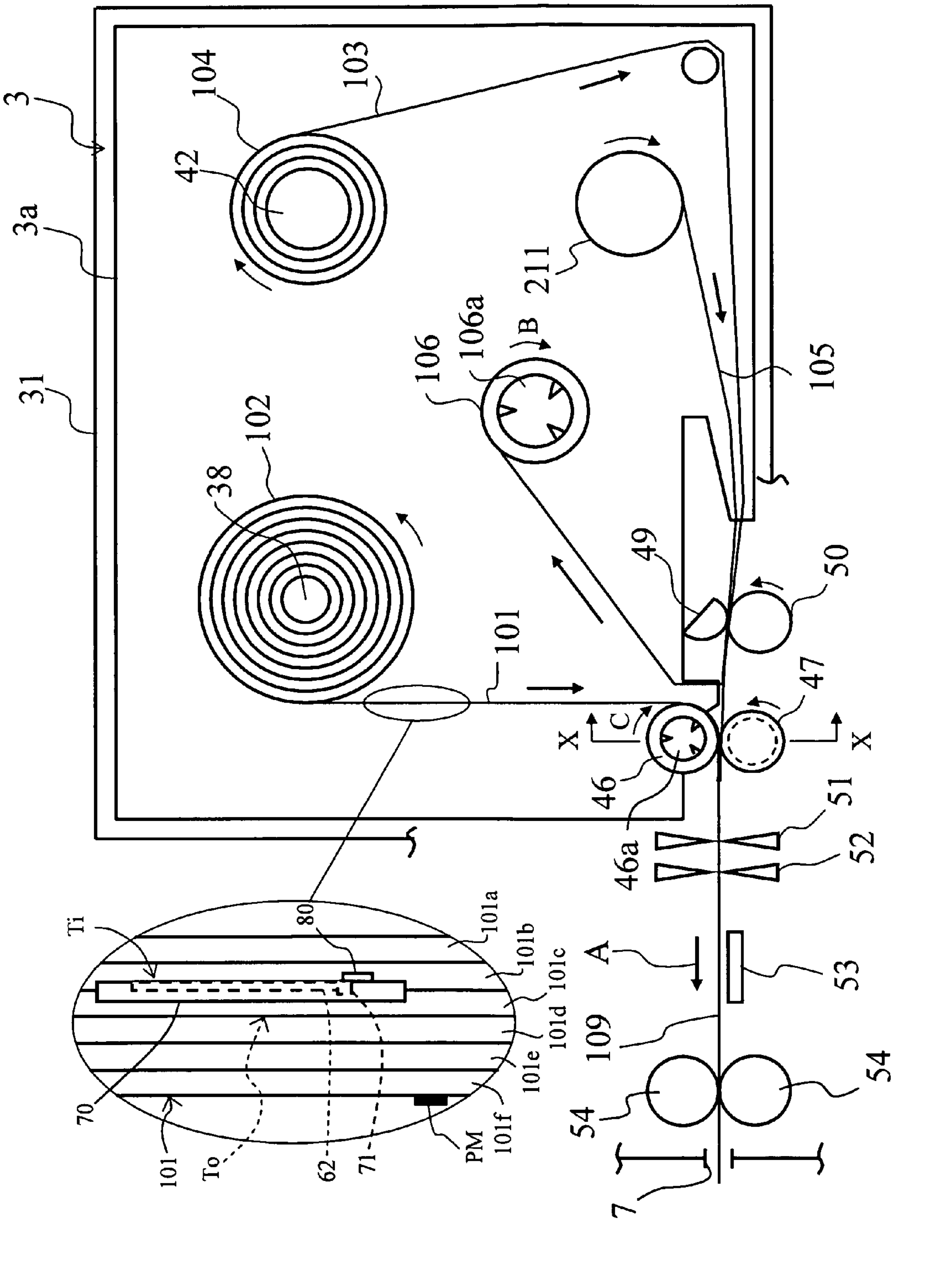
FIG. 3 is a view showing a schematic model of a constitution of a cartridge holder of the apparatus body and main components of a cartridge mounted therein.

As shown in FIG. 3, the cartridge 3 is a box body having a cartridge housing 3*a* formed in a substantially rectangular cubic shape, and the cartridge holder 31 is formed in a recessed shape, capable of containing the cartridge 3 when loaded, in a top part of the apparatus body 2 with the top lid 4 open.

The cartridge 3 comprises a housing 3*a*; a tag tape roll 102 (actually spiral in shape, but simply shown in a concentric shape in the drawings), around which a belt-like tag tape 101 is wound, and which is disposed within the housing 3*a*; a cover film roll 104 (actually spiral in shape, but simply shown in a concentric shape in the drawings), around which a transparent cover film 103 is wound, with substantially the same width as the tag tape 101; a ribbon supply side roll 211 that feeds out an ink ribbon 105 (a heat transfer ribbon, which is not required if using a thermal tape as the print-receiving tape), a ribbon take-up roller 105 that takes up the ribbon 105 after printing, and a feeding roller 46 rotatably supported near a tape discharging part of the cartridge 3. The cartridge holder 31 comprises a feeding roller driving shaft 46*a*, a ribbon take up roller driving shaft 106*a*, a print head 49, a platen roller 50, a sub roller 47, a full cutter 51, a half-cutter 52, an apparatus antenna 53, and a pair of discharging rollers 54. When the cartridge is loaded in the cartridge holder 31, the feeding roller driving shaft 46*a* is inserted from under the cartridge 3, and is fitted coaxially in a spline shaft hole of the feeding roller 46, and the ribbon take-up roller driving shaft 106*a* is inserted from under the cartridge 3 and is fitted coaxially in a spline shaft hole of the ribbon take-up roller 106.

The feeding roller 46 bonds the tag tape 101 and the cover film 103 by applying sandwiching pressure and adhering them, working together with the sub roller 57, thus achieving a tag label tape 109 with print, and feeds this in a direction shown by the arrow A in FIG. 3 (i.e. functioning as a pressure roller as well). Further, the sub roller 47 is formed as a roller with a step with a recess shape slightly smaller in diameter at the center in the axial direction (thickness direction) than at the edges, in the outer circumferential face. (This is described in greater detail in FIG. 4, discussed below.)

The full cutter 51 is provided to a central part between the sub roller 47 and the apparatus antenna 53 along a feeding path (not the exact middle point, but a range including the vicinity thereof). The full cutter 51 is driven by a drive control from a solenoid driving circuit including a solenoid, not shown in the drawings, and completely cuts the tag label tape 109 with print in the thickness direction thereof, thus completing the RFID label T with print.

The half cutter 52 is provided to a central part between the sub roller 47 and the apparatus antenna 53 along the feeding path (not the exact middle point, but a range including the vicinity thereof). The half cutter 52 cuts the tag label tape 109 with print in the thickness direction thereof leaving a separation sheet 101*f* described below by the drive control from a solenoid driving circuit different from that of the full cutter, such that the tag label tape 109 with print is only connected in the tape lengthwise direction by the separation sheet.

The apparatus antenna 53 is formed in a flat shape, and is provided to a position opposing one side of the tag label tape 109 with print downstream in the transport direction of the full cutter 51 and the half cutter 52 in the transport direction of the tag label tape 109 with print (a position parallel to the feeding path).

In the tag tape roll 102, a tag tape 101 in which a plurality of RFID tag insertion bodies Ti are disposed sequentially and at equal intervals in a lengthwise direction is wound around a tag tape reel 38. The tag tape 101 has a 6-layer structure in this example (see the expanded view of the central part of FIG. 3), having an adhesive layer 101*a*, a tape base layer 101*b*, an adhesive layer 101*c*, a tape base layer 101*d*, an adhesive layer 101*e*, and a separation sheet 101*f* laminated in this order from the inner winding side (the right side in FIG. 3) to the opposite side (the left side in FIG. 3).

Figure 8A:
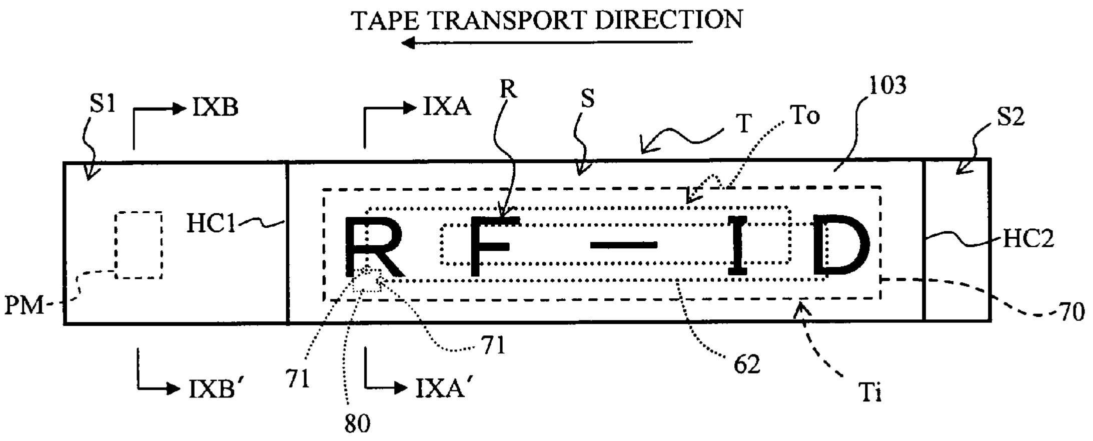
FIGS. 8A and 8B are views showing an example constitution of an RFID label formed by writing (or reading) the information of the RFID circuit element and cutting the tag label tape with print by the tag label producing apparatus.
Figure 8B:
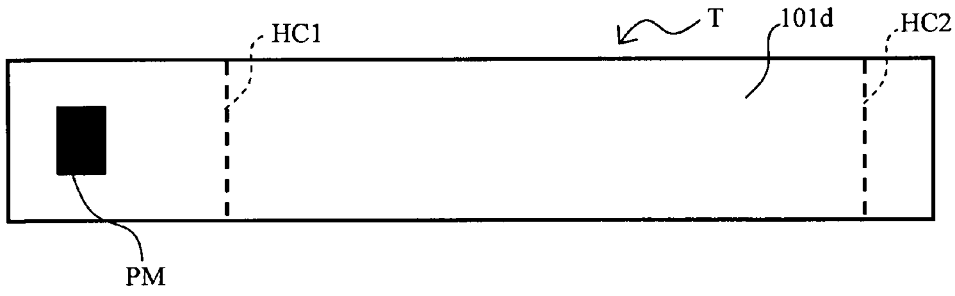
Figure 9A:
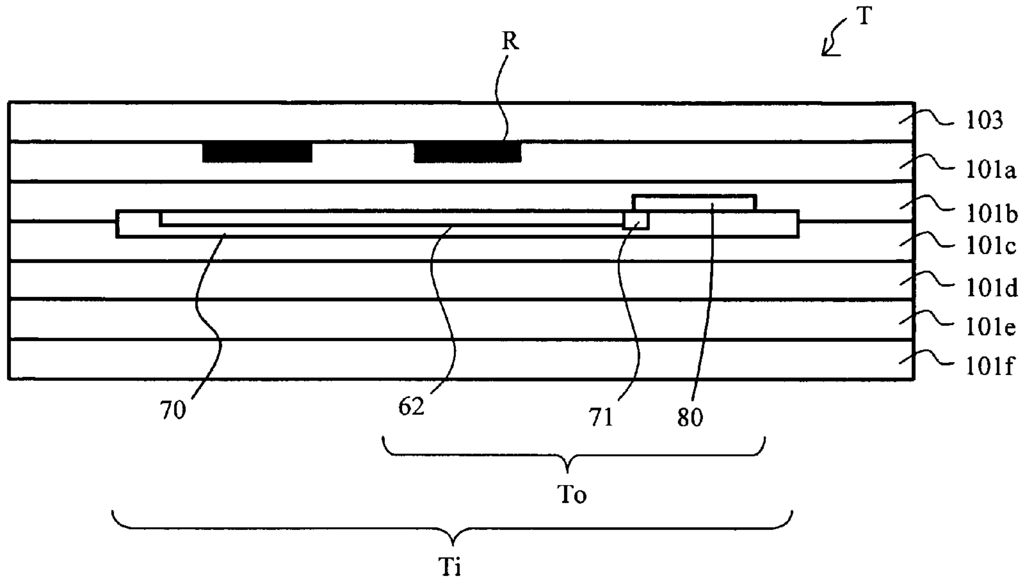
FIG. 9A is a diagram in which a cross-sectional view of the cross-section IXA-IXA' in FIG. 8A is rotated 90° in a counter-clockwise direction.
Figure 9B:
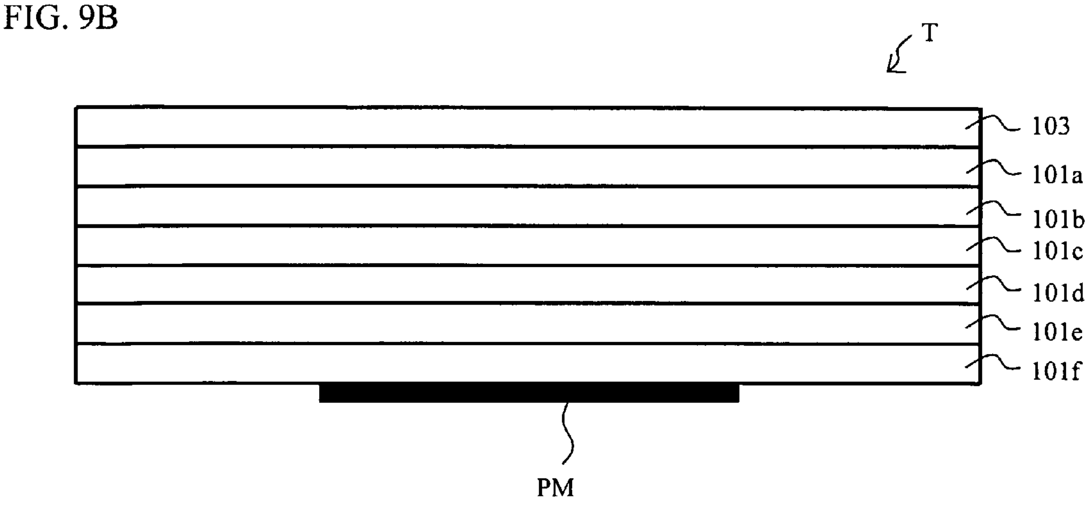
FIG. 9B is a diagram in which a cross-sectional view of the cross-section IXB-IXB' in FIG. 8A is rotated 90° in a counter-clockwise direction.

In this example, the RFID tag insertion bodies Ti are provided to predetermined interval positions in the lengthwise direction in the tag tape 101, between the tape base layer 101*b* and the adhesive layer 101*c*. Note that it is also possible, without being limited to interposing the RFID tag insertion bodies Ti between the tape base layer 101*b* and the adhesive layer 101*c* in this manner, to provide another different adhesive layer between the tape base layer 101*b* and the adhesive layer 1010*c*, and interpose the RFID tag insertion bodies Ti between this adhesive layer and the adhesive layer 101*c*. A base substrate 70 which is a thin sheet-like rectangular member made of resin is provided to each RFID tag insertion body Ti. To this base substrate 70 is provided an RFID circuit element To constituted by an IC circuit part 80 and a tag antenna 62 constituted in a loop coil shape for transmitting and receiving information. The tag antenna 62 and the IC circuit part 80 are joined by a contact 71, which is electrically conductive. (A more detailed description of the constitution of the RFID tag insertion bodies Ti is given in FIG. 8 discussed below.)

The adhesive layer 101*a* is an adhesive layer for bonding the cover film, and functions to bond the cover film 103 to the tag tape 101 as described above. The tape base layer 101*b* and the tape base layer 101*d* are formed in a substantially tape-like shape from, for example, PET or other resin materials. In this example, the RFID tag insertion bodies Ti are disposed between the tape base layer 101*b* and 101*d* by the adhesive layer 101*c* provided to the tape base layer 101*d*. As described above, it is also possible to provide an adhesive layer for affixing to the tape base layer 101*b*. The adhesive layer 101*e* is used for attaching the RFID label T to target merchandise, etc.

The separation sheet 101*f* is peeled off when the RFID label T is adhered as a finished label-like product to a predetermined article or the like, thereby adhering the RFID label T to the article or the like by the adhesive layer 101*e*. Note that a predetermined identification mark (a black identification mark in this example; a hole punched in the tag tape 101 by a laser, etc., or a hole created using a Thompson mold is also possible) PM for transporting control is provided in advance to a predetermined location (in this example, a location farther forward than the front end of the tag antenna 152 in the forward direction of the feeding direction) corresponding to each RFID circuit element To on the surface of the separation sheet 101*f*.

In a cover film roll 104, a cover film 103 is wound around a cover film reel 42. The cover film 103 fed out from the cover film roll 103 is pressed against the ink ribbon 105 driven by the ribbon supply side roll 211 and the ribbon take-up roller 106, which are disposed inward from the back side of the cover film 103 (i.e., the side of the cover film 103 which is affixed to the tag tape 101), by the print head 49, such that the ribbon 105 is brought into close contact with the back side of the cover film 103.

The ribbon take-up roller 106 and the feeding roller 46 are rotationally driven in coordination by a driving force from a roller driving circuit including a feeding motor (not shown in the drawings), which is a pulse motor, for example, provided on the outside of the cartridge 3, transmitted to the ribbon take-up roller driving shaft 106*a* and the feeding roller driving shaft 46*a* via a gear mechanism which is not shown. The pair of discharging rollers 54 are also rotationally driven in coordination by the same roller driving circuit. The print head 49 is disposed upstream in the feeding direction of the cover film 103 from the feeding roller 46.

In the constitution described above, the tag tape 101 fed out from the tag tape roll 102 is supplied to the feeding roller 46. On the other hand, the cover film 103 fed out from the cover film roll 104 is pressed against the ink ribbon 105 driven by the ribbon supply side roll 211 and the ribbon take-up roller 106, which are disposed inward from the back side of the cover film 103 (i.e., the side of the cover film 103 which is affixed to the tag tape 101), by the print head 49, such that the ink ribbon 105 is brought into close contact with the back side of the cover film 103.

When the cartridge 3 is then loaded into the cartridge holder 31, and a roll holder (not shown in the drawings) is moved from a release position to a print position, the cover film 103 and the ink ribbon 105 are sandwiched between the print head 49 and the platen roller 50, while the tag tape 101 and the cover film 103 are sandwiched between the feeding roller 46 and the sub roller 47. Subsequently, the ribbon take-up roller 106 and the feeding roller 46 are synchronously rotationally driven along the directions denoted by the arrow B and the arrow C, respectively, in FIG. 3 by the driving control provided by the roller driving circuit. The feeding roller driving shaft 46*a*, the sub roller 47, and the platen roller 50, described above, are linked by a gear mechanism (not shown). With such an arrangement, upon driving the feeding roller driving shaft 46*a*, the feeding roller 46, the sub roller 47, and the platen roller 50 rotate, thereby feeding out the tag tape 101 from the tag tape roll 102 to the feeding roller 46 as described above.

On the other hand, the cover film 103 is fed out from the cover film roll 104 and power is supplied to a plurality of heat emitting elements of the print head 49 by a print head driving circuit which is not shown. As a result, printing is performed on the back side of the cover film 103, thereby forming the print R (see FIG. 8 described below), which corresponds to the RFID circuit element To on the tag tape 101 that is to be bonded. The base tape 101 and the cover film 103 on which printing has finished are adhered to each other by the feeding roller 46 and sub roller 47 so as to form a single tape, thereby forming the tag label tape 109 with print, which is then fed out of the cartridge 3. Subsequently, the ribbon take-up roller driving shaft 106*a* is driven to take up the ink ribbon 105, which has been used to print the print on the cover film 103, onto the ribbon take-up roller 106.

Then, after the information of the tag label tape 109 with print bonded and produced as described above is read and written to the RFID circuit element To for label production by the apparatus antenna 53, the tag label tape 109 with print is cut either automatically or by operating the cutter driving button 10 (see FIG. 2) and thus operating the full cutter 51 by the solenoid and drive control from the solenoid, not shown, thereby forming the RFID label T. The RFID label T is discharged from the label discharge opening 7 (see FIG. 2) by being sandwiched and transported by the pair of discharge rollers 54.

Figure 4:
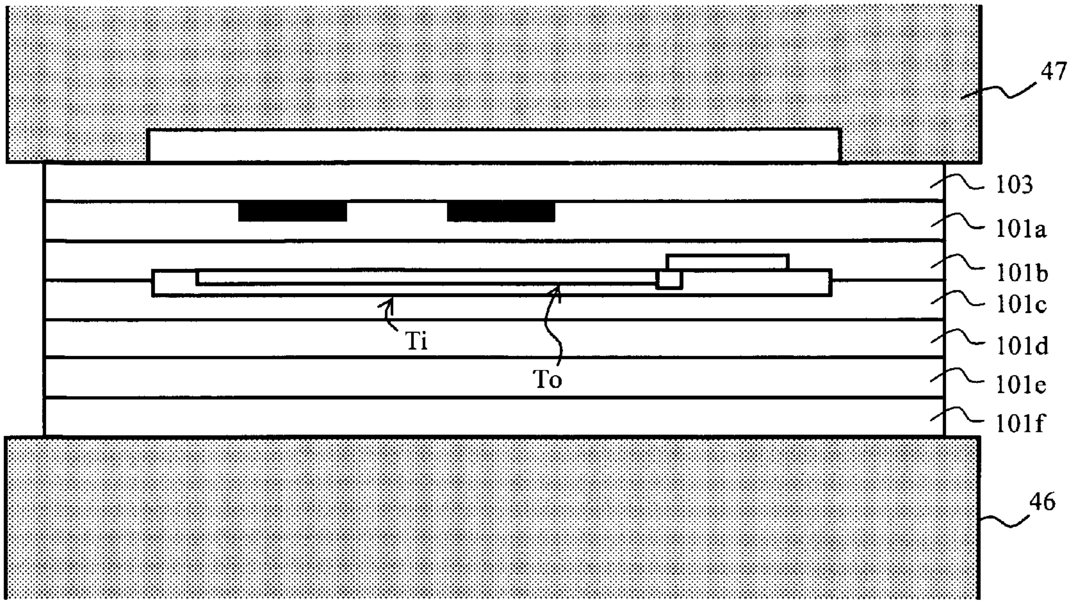
FIG. 4 is a view showing a cross-section view rotated 90° along cross-section X-X in FIG. 3 and showing the tag tape and the cover film transported and pressed together, when an IC circuit part is positioned between a recessed sub roller and a feeding roller.

As shown in FIG. 4, the tag tape 101 and the cover film 103 are sandwiched and pressed together between the sub roller 47 positioned above in FIG. 4 and the feeding roller 46 positioned below in the drawing. Note that the left-right direction in the drawing is shown corresponding to the tape width direction of the tag tape 101. Of the RFID tag insertion bodies Ti provided between the tape base layer 101*b* and the adhesive layer 101*c*, the RFID circuit element To constituted by the IC circuit part 80 and the tag antenna 62 is disposed to a substantially central area in the tape width direction of the tag tape 101.

The sub roller 47 is formed with the outer circumferential surface thereof in a recessed shape, the diameter of the central part in the axial direction (the tape width direction; the left-right direction in FIG. 4) having a smaller diameter than the edges, as described above, and the area in which the smaller diameter is formed in the axial direction (the width direction dimension) is a size that approximately contains the entire area in which the RFID circuit elements To are present in the tag tape 101 in the tape width direction. In other words, the sub roller 47 come in contact with the tag tape 101 at outer parts but not at the area in which the RFID circuit elements To are present in the interior of the tag tape 101 in the tape width direction.

Figure 5:
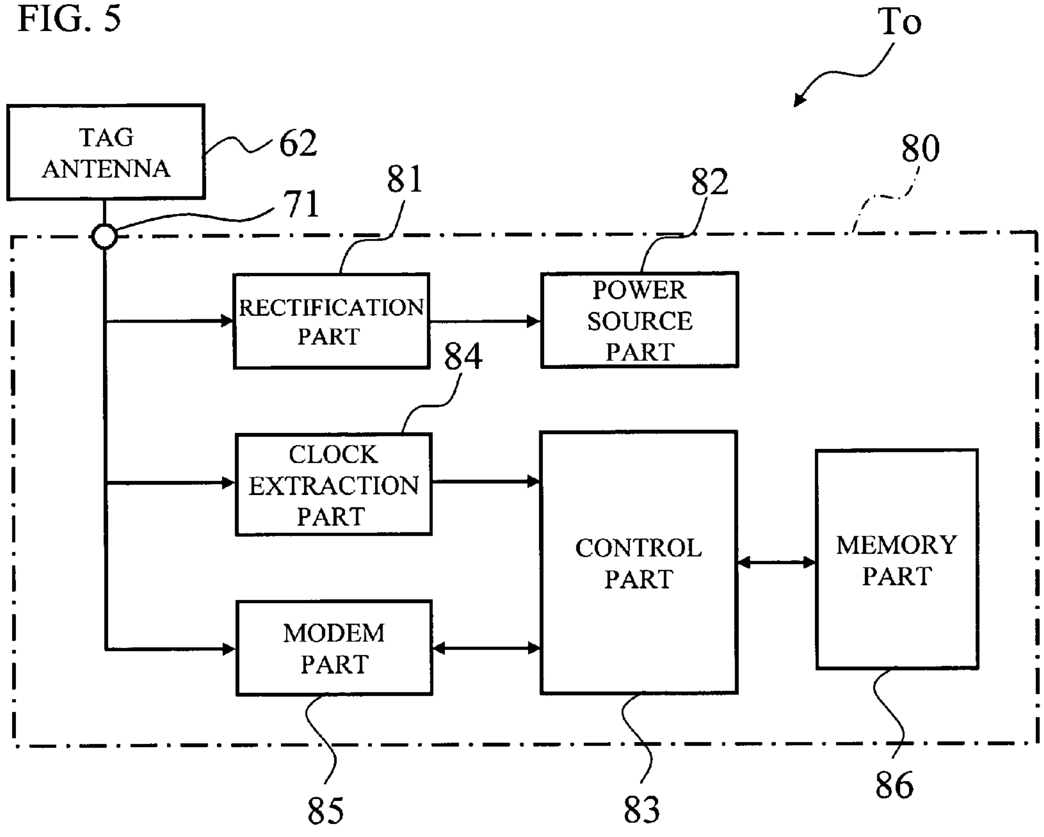
FIG. 5 is a functional block diagram showing a functional configuration of an RFID circuit element.

As shown in FIG. 5, the RFID circuit element To comprises the IC circuit part 80 and the tag antenna (in the example a loop antenna) connected thereto via the contact 71.

The IC circuit part 80 comprises a rectification part 62 that rectifies the interrogation waves received via the tag antenna 62, a power source part 81 that stores energy from the interrogation waves rectified by the rectification part 82, and serving as a drive power supply, a clock extraction part 84 that extracts clock signals from the interrogation waves received by the tag antenna 62 and supplies the clock signals thus extracted to a control part 83, a memory part 86 capable of storing predetermined information signals (e.g., data associated with transmission and reception with the tag label producing apparatus 1), a modem part 85 connected to the tag antenna 62, and the control part 83 that controls operation of the RFID circuit elements To via the memory part 86, the clock extraction part 84, the modem part 85, and so on.

The modem part 85 demodulates communication signals from the tag label producing apparatus 1 received by the tag antenna 62, modulates a response signal from the control part 83, and re-sends this as a response with the tag antenna 62.

The control part 83 executes basic control, such as interpreting a received signal demodulated by the modem part 85, generating a response signal based on the information signal stored in the memory part 86, and returning the response signal from the modem part 85.

The clock extraction part 84 extracts the clock component from the received signal and supplies the clock corresponding to the frequency of the clock component of the received signal to the control part 83.

Figure 6:
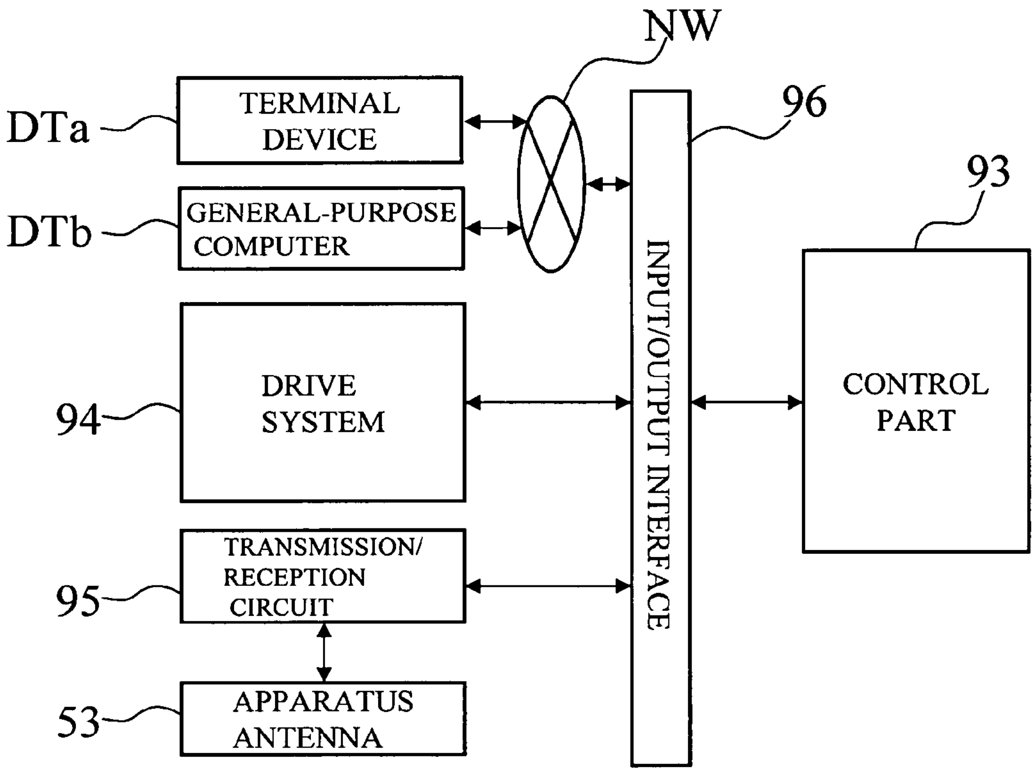
FIG. 6 is a functional block diagram illustrating a functional constitution of a control system of the tag label producing apparatus.

As shown in FIG. 6, a control part 93 made up of, for example, a microprocessor is provided to the tag label producing apparatus. Via an input/output interface 96, the control part 93 is connected to the communications network NW to which the terminal device DTa and general purpose computer DTb described above are connected.

To the input/output interface 96 are connected a drive system 94 made up of the roller driving circuit of the cartridge holder 31, the print head driving circuit, the solenoid driving circuit, and so on, and a transmission/reception circuit connected to the apparatus antenna 53.

Figure 7:
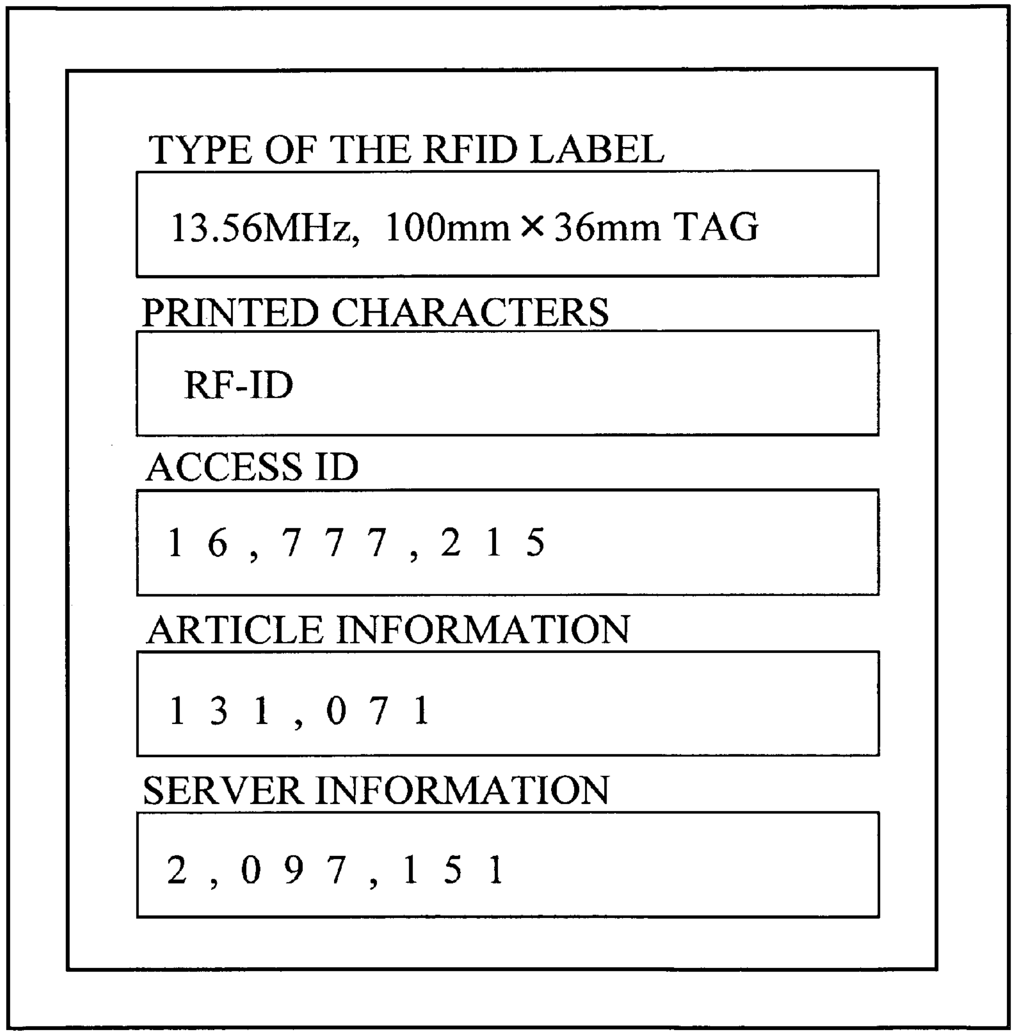
FIG. 7 is a view showing an example of a display screen of the terminal device when producing RFID labels.

The example shown in FIG. 7 is included the type of the RFID label T (access frequency and tag label dimensions), print characters printed by the print head 49, an access ID which is identification information unique to the RFID circuit element in the RFID label T, an address of article information stored in the information server of FIG. 1, and the storage address for corresponding information in the root server RS of FIG. 1.

In FIGS. 8A, 8B, 9A, and 9B the RFID label T has a 7-layer structure in which the cover film 103 is added to the tag tape 101 that has a 6-layer structure shown in FIG. 3 described above. The 7 layers are constituted by the cover film 103, the adhesive layer 101*a*, the tape base layer 101*b*, the adhesive layer 101*c*, the tape base layer 101*d*, the adhesive layer 101*e*, and the separation sheet 101*f*, which are laminated from the cover film 103 (the upper side in FIG. 9) towards the opposite side (the lower side in FIG. 9). The RFID tag insertion bodies Ti including the RFID circuit elements To are provided between the tape base layer 101*b* and the adhesive layer 101*c* as described above, and the label print R (in this example, the characters "RF-ID" indicating the type of the RFID label T) corresponding to information stored in the RFID circuit element To is printed to the rear face of the cover film 103.

On the cover film 103, the adhesive layer 101*a*, the tape base layer 101*b*, the adhesive layer 101*c*, the tape base layer 101*d*, and the adhesive layer 101*e* are formed half-cut lines HC (half-cut areas; two lines in this example: a front half-cut line HC1 and a rear half-cut line HC2) substantially along the tape width direction by the half-cutter 52 as described above. In the cover film 103, an area sandwiched between the half-cut lines HC1 and HC2 becomes a print area S in which the print R is printed, and both sides in the tape lengthwise direction between these half-cut lines HC1 and HC2 from the print area S are the front margin area S1 and rear margin area S2, respectively.

In the RFID circuit elements To provided to the RFID tag insertion bodies Ti, the loop coil-shaped tag antenna 62 is formed in a long, substantially rectangular shape along the tape transport direction (tape length direction) of the RFID label T, the IC circuit part 80 is positioned at the tip of the tag antenna 62 downstream in the tape transport direction (the left side in FIG. 8A) and the lower side in the tape width direction (the bottom side of FIG. 8A and the right side of FIG. 9A), and is connected to both ends of the tag antenna 62 via at least one contact 71 (in this example there are two). The RFID circuit elements To are provided to the base substrate 70 such that the position of the IC circuit part 80 is downstream of the base substrate 70 in the transport direction from the center line in the transport direction.

The most significant feature of the present embodiment is that during tape feeding, communication is performed after the IC circuit part 80 is transported downstream of a segment from the sub roller 47 to the apparatus antenna 53 in the transport direction. Details of this will be given in sequence below.

First, general properties associated with communication performance of the RFID circuit element To provided to the tag tape 101 are described. As is publicly known, the RFID circuit element To is compact while still performing wireless communication using high frequency waves. For this reason, if, for example a member is bend due to application of stress around the contact 71 connecting the IC circuit part 80 and the tag antenna 62, there is possibility of this affecting the communication performance properties by changing the floating capacitance between the members.

When such an IC circuit part 80 is provided inside the tag tape 101, there exists the possibility of changes to the communications properties due to the application of stress to the area surrounding the contact 71 connecting the IC circuit part 80 and the tag antenna 62, when wound around the tag tape roll 102 inside the cartridge 3 or when being pressed or flexed due to contact with the rollers.

However, when the tag tape 101 is released from the loaded state, such as being flexed or pressed as described above, and returns to a normal, straight state, the stress on the RFID circuit element To itself is also released due to the restoring force, and it is possible to the normal communication properties.

Figure 10:
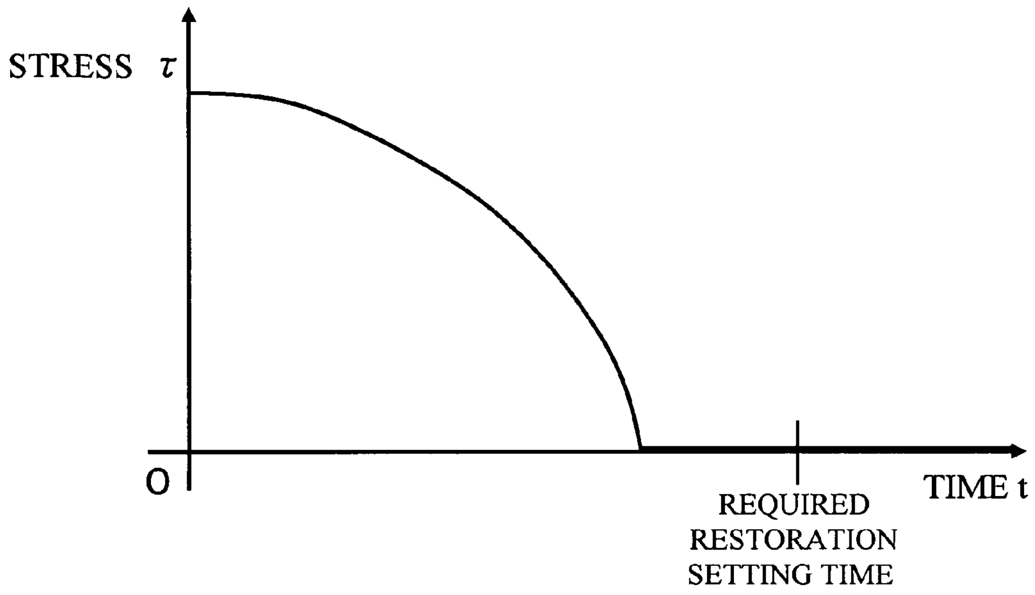
FIG. 10 is a conceptual view showing in a time series the change in stress in the RFID circuit element after the tag tape is released from the loaded state.

As shown in FIG. 10, after the tag tape 101 is released from the loaded state, the interior stress (in this case, shearing stress $\tau$) of the RFID circuit element To clearly dissipates with the passage of time, and then completely disappears (restores to a completely normal communication property state). In other words, if a sufficient amount of time for the RFID circuit element To to restore completely to the normal communication property state is set as the required restoration setting time, completely normal communication could be performed through wireless communication with the apparatus antenna 53 after the required restoration setting time had elapsed since the RFID circuit element To had passed the point in the transportation of the tag tape 101 at which the loaded state is imposed.

Figure 11A:
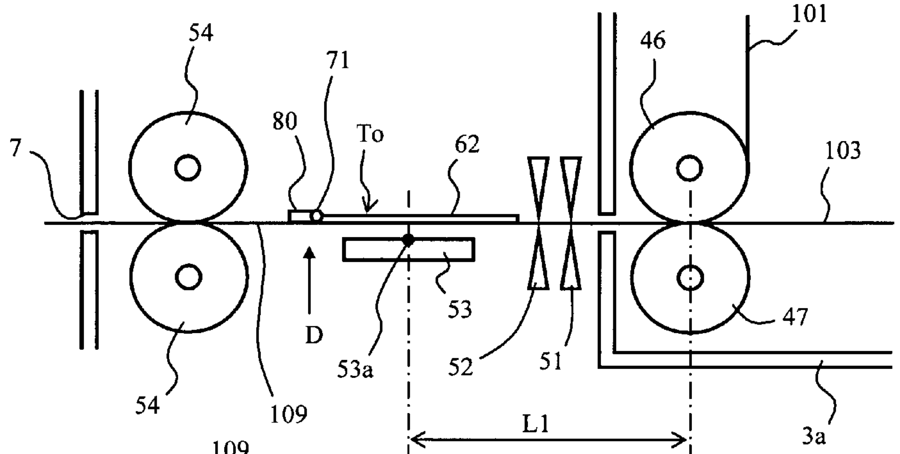
FIG. 11A is a side view corresponding to FIG. 3.
Figure 11B:
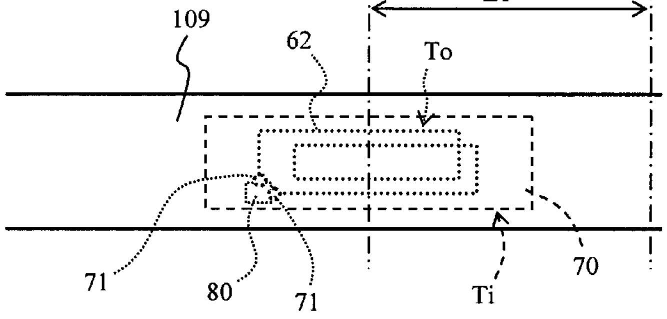
FIG. 11B is a bottom view of the tag label tape with print seen from auxiliary view D in FIG. 11A.

In FIGS. 11A and 11B, as shown in FIG. 3, the tag tape 101 is flexed by contact with the outer circumference of the feeding roller 46, pressed between the feeding roller 46 and the sub roller 47 together with the cover film with print 103, thus becoming the tag label tape 109 with print. Note that in FIG 11A, the RFID circuit element To is exaggerated in order to make clear the positional relation, and, further, in order to avoid cluttering the drawing, the print R on the surface of the tag label tape 109 with print in FIG. 11B has been omitted. The full cutter 51 and the half cutter 52 are positioned just downstream of the feeding roller 46 and the sub roller 47 in the transport direction. The apparatus antenna 53 that performs wireless communication with the RFID circuit element To is provided further downstream in the transport direction. Further, the tag label tape 109 with print is sandwiched and fed by the pair of discharge rollers 54 further downstream in the transport direction, and discharged from the label discharge opening 7 downstream of that as the RFID label T.

Here, of the members constituting the present embodiment, the members which might affect the communication performance of the RFID circuit element To by imposing a loaded state on the tag tape 101 are the rollers which feed the tag tape 101 and the tag label tape 109 with print positioned closest to the apparatus antenna 53. In the example of the present embodiment shown in the drawings, these are the sub roller 47 provided to the tag label producing apparatus 1 and the feeding roller 46 provided to the cartridge 3.

In the present embodiment, the time from the IC circuit part 80 passing the sub roller 47 and the feeding roller 46 and then passing a reference point 53 of the apparatus antenna 53 (a center position in the tape transport direction in this example) is set in advance so as to be at least the required restoration setting time. In other words, in the example of the present embodiment, even if the portion of the tag tape 101 in the tape direction area including the IC circuit part 80 is pressed, the stress applied to the members around the IC circuit part 80 are completely eliminated and a normal state is completely restored to from the time of release from the loaded state imposed by the feeding roller 46 and the sub roller 47 until passing through the reference point 53*a* of the apparatus antenna 53.

Accordingly, with the present embodiment, using these properties, the control part controls the drive system 94 and the transmission/reception circuit 95, etc., such that information transmission/reception by wireless communication between the apparatus antenna 53 and the RFID circuit element To is performed after the IC circuit part 80 of the RFID circuit element To passes downstream in the tape transport direction of a segment L1 from the position of the sub roller 47 to the position of the apparatus antenna 53.

At the moment wireless communication is performed by the apparatus antenna 53 with the tag antenna 62 (e.g., the moment when the RFID circuit element To reaches the feeding portion shown in FIG. 11), in order to ensure that the IC circuit part 80 has definitely passed downstream in the tape transport direction from the segment L1, the position of the IC circuit part 80 in the RFID circuit element To is constituted so as to be downstream of the transport direction center line of the tag antenna 62 (the downstream tip in the example of the present embodiment).

Further, particularly in the present embodiment, the control part 93 controls the drive system 94 and the transmission/reception circuit 95 such that the tape feeding is temporarily stopped when the RFID circuit element To and the apparatus antenna 53 are in a positional relation directly opposite each other as shown in FIG. 11, and then such that wireless communication is performed between the apparatus antenna 53 and the RFID circuit element To. Note that other than stopping the tape feeding as in the present embodiment, it is also possible to, for example, slow the tape feeding speed and perform information transmission/reception while transporting at the lower speed.

Note also that in the above, the feeding path of the tag tape 101 fed out from the tag tape roll 102, the feeding path of the cover film 103 fed out from the cover film roll 104, and the feeding path of the tag label tape 109 with print after being bonded by the feeding roller 46 and the sub roller 47 constitute the feeding path by the feeding rollers in the claims.

As described above, with the tag label producing apparatus 1 of the present embodiment, the tag tape 101 and the cover film 103 are transported by the driving force of the platen roller 50 and the sub roller 47. Further, desired printing is performed by the print head 49 on the cover film 103 bonded to the tag tape 101. After bonding the tag tape 101 and the cover film 103 on which printing is finished, information transmission/reception is performed from the apparatus antenna 53 to the RFID circuit element To provided to the tag label tape 109 with print (the tag tape 101), thus making it possible to produce the RFID labels T with print.

Communication between the apparatus antenna 53 and the RFID circuit element To is performed by the control of the control part 93 of the tag label producing apparatus 1, once the IC circuit part 80 of the RFID circuit element To has passed downstream in the tape transport direction of the segment L1 from the sub roller 47 and the feeding roller 46 to the apparatus antenna 53.

Thus, even if the contact 71 between the IC circuit part 80 and the tag antenna 62 receives pressure from the sub roller 47 or the feeding roller 46 (before communication), the affects of the pressure will have disappeared as sufficient time will have elapsed, and thereafter communication between the apparatus antenna 53 and the RFID circuit element To is performed. Accordingly, it is possible to improve the reliability and stability of communication during production of RFID labels T and prevent occurrences of communication errors.

Further, particularly with the present embodiment, by disposing the IC circuit part 80 further towards the downstream side in the transport direction from the center line in the transport direction in the apparatus antenna 53, the entire tag antenna 62 is substantially opposed to the apparatus antenna 53 when the contact 71 has passed downstream of the segment L1 (e.g., the center lines in the transport direction substantially meet; see FIG. 11). Thus, the reliability and stability of communication during production of RFID labels T can thus be improved.

Further, particularly with the present embodiment, by partially cutting the tag label tape 109 with print in the thickness direction with the half cutter 52, it is possible to release remaining distribution of pressure (stress) acting upon the laminate structure by the sub roller 47 and the feeding roller 46 with this partial cutting position (the half cut lines HC1 and HC2). The effects of pressure are even further relieved, making communication with high reliability possible.

Further, particularly with the present embodiment, the sub roller 47 is a roller with a step in which a part which comes in contact with the RFID circuit element To of the tag tape 101 has a more recessed shape than other parts (see FIG. 4). Thus, when the sub roller 47 comes in contact with the tag tape 101, it is possible to prevent pressure from occurring on the contact 71 between the IC circuit part 80 and the tag antenna 62 of the RFID circuit element To. As a result, it is possible to perform highly reliable communication.

Figure 12:
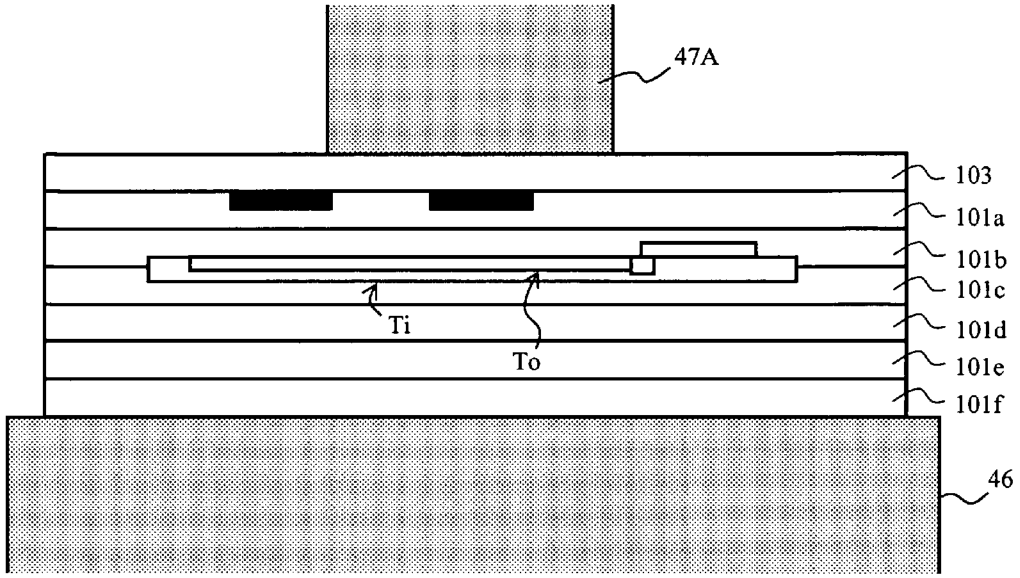
FIG. 12 is a view showing a cross-section view along cross-section X-X in FIG. 3 when an IC circuit part is positioned between a narrow sub roller and a feeding roller.

Note that in a case in which the IC circuit part 80 is disposed towards on side in the tape width direction as in the RFID circuit element To of the present embodiment, the same effect can be provided even with a constitution as shown in FIG. 12 corresponding to FIG. 4, in which a sub roller 47A is formed with a sufficiently narrow width dimension that only the central portion in the tape width direction touches, without the contact 71 being pressed.

Note that, in addition to the above, various modifications may be made according to the present embodiment without departing from the spirit and scope of the disclosure. Description will be made below regarding such modifications.

(1) Printing Directly on the Tag Tape Without Bonding the Cover Film.

With the present embodiment, an example was given of a tag label producing apparatus 1 in which a cover film 103 which is printed on is bonded to a tag tape 101 comprising an RFID circuit element To. The present disclosure may also be applied to a tag label producing apparatus in which printing is done directly on the tag tape, without bonding a cover film.

Figure 13:
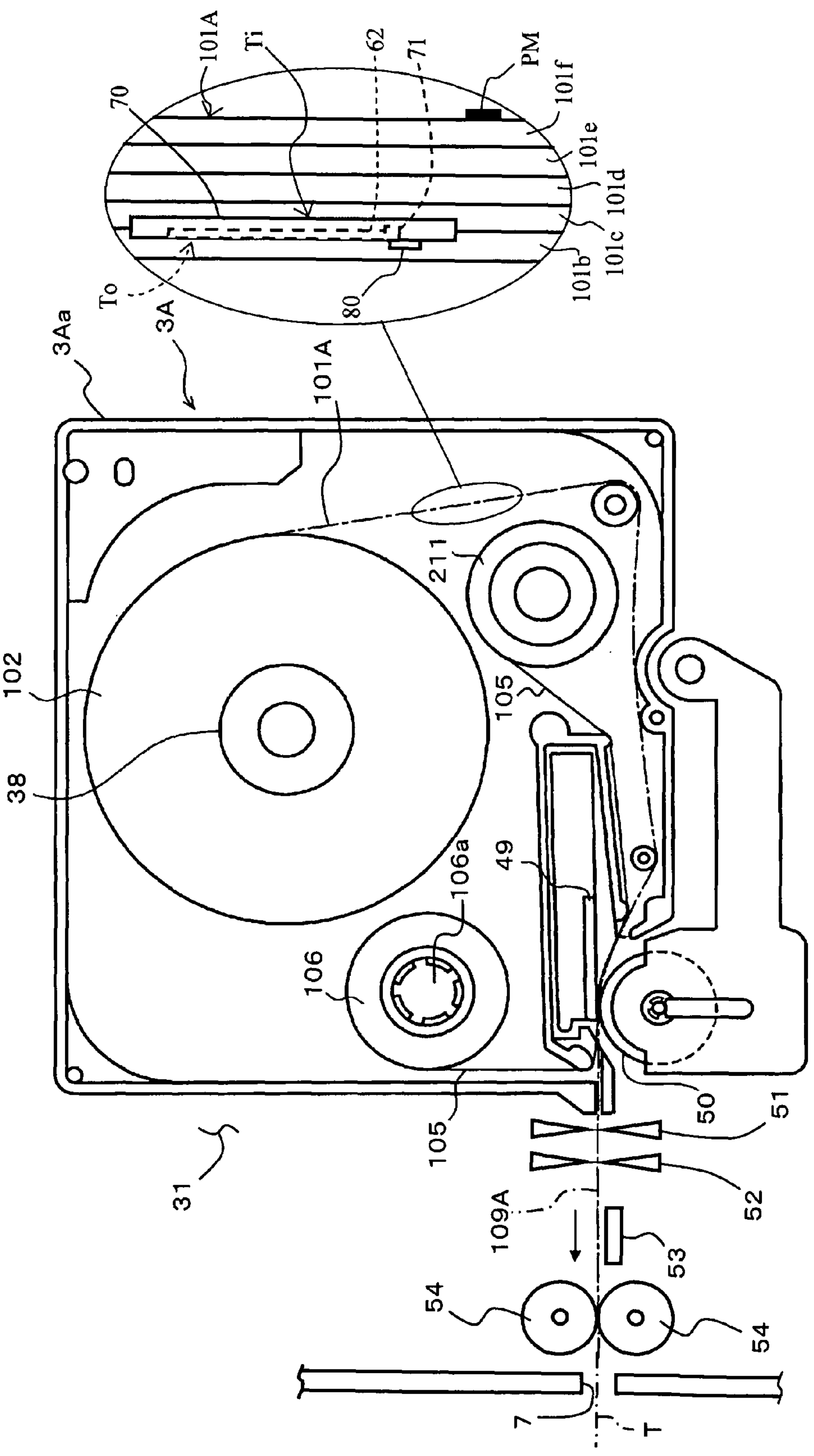
FIG. 13 is a schematic view showing a constitution of a cartridge holder and main components of a cartridge mounted therein, according to a modification in which printing is performed directly on the tag tape, and corresponds to FIG. 3 in the embodiment above.

As shown in FIG. 13, a cartridge 3A according to this modification does not comprise the cover film roll 104 of the embodiment above, and instead, a tag tape 101A is transported along a similar feeding path as the cover film 103 in the above embodiment, and printing is performed directly on the tag tape 101A. Note that the same reference numerals are given to equivalent components in the constitution of the cartridge holder 31 and the cartridge holder 31 of the embodiment above, and the description is omitted as appropriate. Namely, the tag tape 101A fed out from the tag tape roll 102A is sandwiched between the print head 49 and the platen roller 50 together with the ink ribbon 105 fed out from the tag tape roll 102A, and print R is printed onto the surface of the tag tape 101A by supplying power to the print head 49. The tag tape 101A, after being printed on, is discharged from the cartridge 3A, passes by the full cutter 51, the half cutter 52, and the apparatus antenna 53, and is discharged from the label discharge opening 7 by being sandwiched and transported by the pair of discharging rollers 54. Note that in this modification, the feeding roller 46 and the sub roller 47 of the above embodiment are not provided (the absence of the cover film 103 obviates the need for them, as nothing is bonded to the tag tape 101A).

The constitution of the tag tape 101A is such that, since printing is performed directly to the surface of the tape base layer 101B, the adhesive layer 101*a* of the above embodiment is not provided (in this example), resulting in a 5-layer structure (see the enlarged view in FIG. 13). In the example shown in the drawings, the constitution is such that the tape base layer 101*b*, the adhesive layer 101*c*, the tape base layer 101*d*, the adhesive layer 101*e*, and the separation sheet 101*f* are laminated in that order from the side on which they are wound onto the tag tape roll 102A (the left side or the top side in FIG. 13) to the opposite side (the right side or the bottom side in FIG. 13), in order for the print head 49 to come in contact with the surface of the tape base layer 101*b*. The constitution of the RFID tag insertion bodies Ti including the RFID circuit elements To and other constitutions are the same as in the above embodiment, and therefore a description thereof is omitted.

Figure 14A:
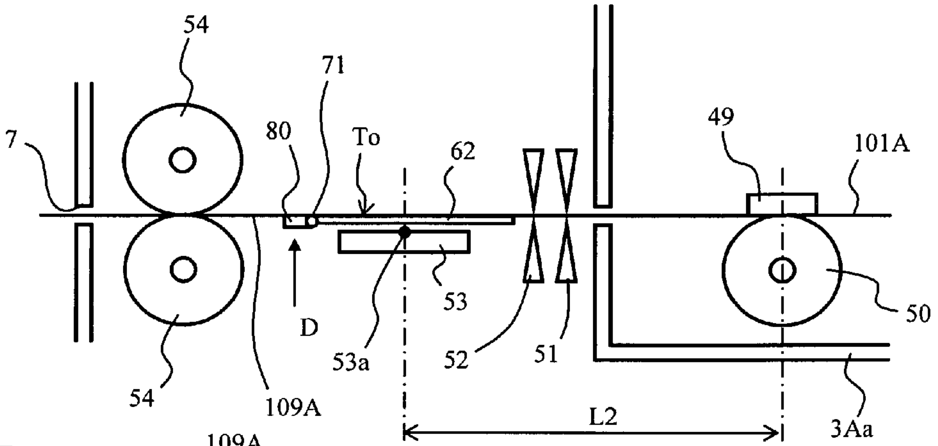
FIG. 14 is a schematic view showing a positional relationship among components around an apparatus antenna in a modification in which printing is performed directly on the tag tape, and corresponds to FIG. 11 of the above embodiment.
Figure 14B:
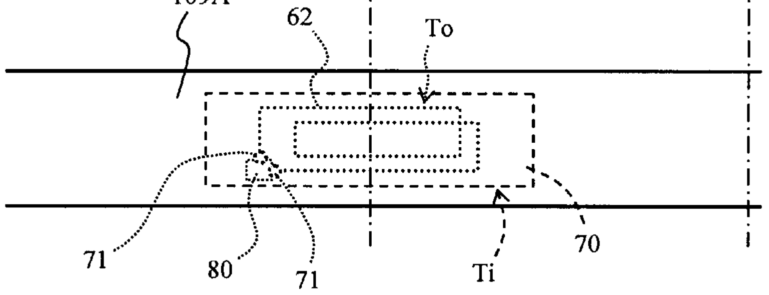

As shown in FIG. 14, with this modification, the tag tape 101A is transported along the feeding path since the cover film 103 is not provided as described above, and after being sandwiched between the print head 49 and the platen roller 50 and printed on, is discharged from the cartridge 3A as a tag label tape 109A with print. Immediately downstream of the cartridge housing 3Aa in the downstream direction are positioned the full cutter 51 and the half cutter 52, and still further downstream in the transport direction is provided the apparatus antenna 53. Further, the tag label tape 109A with print is sandwiched and transported by the pair of discharge rollers 54 further downstream in the transport direction, and discharged from the label discharge opening 7 immediately downstream of that as the RFID label T.

With this modification, information transmission/reception through wireless communication between the apparatus antenna 53 and the RFID circuit element To after the IC circuit part 80 of the RFID circuit element To passes downstream in the tape transport direction of a segment L2 from the position of the platen roller 50 to the position of the apparatus antenna 53 (the position of the reference point 53*a*).

As described above, in the present modification, the tag tape 101A is transported by the platen roller 50 and desired printing is performed by the print head 49, information transmission/reception from the apparatus antenna 53 is performed to the RFID circuit element To provided to the tag tape 101A thereafter, thus making it possible to produce the RFID label T with print. Communication is performed between the apparatus antenna 53 and the RFID circuit element To after the IC circuit part 80 has passed downstream in the transport direction of the segment L2 based on the control of the control part 93. The same effects as with the above embodiment can thus be provided.

In the tag label producing apparatus IA of this modification, there are also cases in which the feeding roller 46 and the sub roller 47 are provided in order to ensure commonality with the constitutions of the cartridge housing 3Aa and the cartridge holder 31 used in the tag label producing apparatus 1 of the above embodiment. In this case, as with the above embodiment, communication between the apparatus antenna 53 and the RFID circuit element To is performed once the IC circuit part 80 of the RFID circuit element To has passed downstream in the tape transport direction of the segment L1 (the segment from the sub roller 47 and the feeding roller 46 to the apparatus antenna 53).

(2) Other

Further, in the above a description was given using as an example a case in which the RFID label T is produced by cutting with the full cutter 51 the tag label tape 109A with print in which printing and accessing (reading or writing) of the RFID circuit element To are complete, this is not a limitation. In other words, in a case in which a label mount (a so-called die cut label) separated in advance to a predetermined size corresponding to the label is continuously disposed on the tape fed out from the roll, it is also possible for the label not to be cut using the full cutter 51, but rather to peel only the label mount (a label mount containing the accessed RFID circuit element To for label production on which corresponding printing has been performed) from the tape after the tape has been discharged from the discharge opening 16, thereby producing RFID labels T.

Furthermore, the present disclosure is also not limited to a case where the RFID tag information is read from or written to the IC circuit part 80 of the RFID circuit element To, and print for identifying the RFID circuit element To is printed by the print head 49. This printing does not necessarily need to be performed, and the present disclosure may be applied to a case where RFID tag information is only read or written.

Furthermore, while in the above a case in which the tag tape 101 and 101A is wound around a reel member so as to form a roll, and the roll is disposed within the cartridge, and hence the tag tape 101 and 101A is fed out from the cartridge has been described as an example, the present disclosure is not limited thereto. For example, a long-length or rectangular tape or sheet (including tape cut to a suitable length after being supplied from a roll) in which at least one RFID circuit element To is disposed is stacked (e.g., flat-stacked in a tray-like object) in a predetermined storage part so as to form a cartridge. The cartridge is then mounted to the cartridge holder of the tag label producing apparatus 1. Then, the tape or sheet is supplied or fed from the storage part, and printing or writing is performed, thereby creating RFID labels T.

Also possible is a constitution in which the roll is removably mounted directly onto the tag label producing apparatus 1 and 1A, or a constitution in which long tape-like or short rectangular tape or sheets are carried by a predetermined feeder mechanism one sheet at a time from outside the tag label producing apparatus 1 and 1A and supplied into the tag label producing apparatus 1 and 1A, or without being limited to something attachable to the tag label producing apparatus 1 like the cartridge 3 and 3A, also possible is a constitution in which a tag tape roll 102 and 102A is provided to the apparatus body unremovably embedded or integral to the apparatus body. In each of these cases as well, the same effect is achieved.

Additionally, other than those previously described, approaches according to the respective embodiments and exemplary modifications may be utilized in combination as appropriate.

Note that various modifications which are not described in particular can be made according to the present disclosure without departing from the spirit and scope of the disclosure.

What is claimed is:

1. A tag label producing apparatus comprising:

a cartridge holder capable of loading/removing a cartridge that supplies a tag tape including an RFID circuit element comprising an IC circuit part that stores information and a tag antenna that transmits and receives information;

at least one feeding roller that feeds said tag tape supplied from said cartridge along a feeding path at a predetermined speed;

a printing device that performs desired printing on said tag tape or on a print-receiving tape bonded to said tag tape; and an apparatus antenna located downstream from said printing device in a transport direction along said feeding path, that transmits and receives information to and from said RFID circuit element by wireless communication; wherein:

said feeding roller includes a nearest roller being closest to said apparatus antenna in an area located upstream from said apparatus antenna along said feeding path, that transmits and receives information to and from said RFID circuit element by wireless communication; wherein and said feeding roller includes a nearest roller being closest to said apparatus antenna in an area located upstream from said apparatus antenna along said feeding path, and said apparatus antenna is disposed in a position that is away from said nearest roller along said feeding path with a predetermined distance, and wherein said tag label producing apparatus further comprises:

a cutting device that cuts an entire thickness of said tag tape in which information transmission/reception by using said apparatus antenna and a printing by said printing device are completed so at to produce an RFID label with print, said cutting device being disposed between said nearest roller and said apparatus antenna;

a half-cutting device that partially cuts in a thickness direction of said tag tape in which information transmission/reception by using said apparatus antenna and a printing by said printing device are completed, said half-cutting device being disposed at a portion between said nearest roller and said apparatus antenna;

a communication control portion that controls said apparatus antenna such that information transmission/reception is performed with said RFID circuit element by wireless communication when said RFID circuit element substantially opposes said apparatus antenna; and;

a control portion configured for controlling said feeding roller such that a feeding of said tag tape is slowed or stopped after said IC circuit part is fed downstream from said nearest roller in said transport direction so that a time between when the IC circuit passes said nearest roller and when said information transmission/reception is performed with said RFID circuit element is at least a predetermined restoration setting time;

whereby an interior stress in said RFID circuit element due to pressure from said nearest roller to said RFID circuit is dissipated when information transmission/reception is performed.

2. The tag label producing apparatus according to claim 1, wherein:

said control portion performs control such that said information transmission/reception is performed when said IC circuit part is transported downstream in said transport direction from a segment from said nearest roller to a center position of said apparatus antenna along said transport direction.

3. The tag label producing apparatus according to claim 2, wherein:

said tag tape includes a plural of RFID tag insertion bodies arranged at regular intervals, said RFID tag insertion body comprising said RFID circuit element disposed on an antenna base in a manner that the position of said IC circuit part is farther downstream in said transport direction than a center line of said antenna base in said transport direction, said feeding roller feeds said tag tape, and said control portion performs control such that said information transmission/reception is performed when said tag tape is fed such that said IC circuit part is transported downstream in said transport direction from the segment from said nearest roller to the center position of said apparatus antenna along said transport direction.

4. The tag label producing apparatus according to claim 3, wherein:

said print tape to be bonded to said tag tape, said printing device performs desired printing said print-receiving tape, said feeding roller includes:

a pressure roller that presses said print-receiving tape against said printing device; and a bonding roller located downstream from said pressure roller in said transport direction with respect to said feeding path, that bonds said tag tape and said print-receiving tape, said nearest roller is said bonding roller, and said control portion performs control such that said information transmission/reception is performed when said tag tape and said print-receiving tape are fed such that said IC circuit part is transported downstream in said transport direction from the segment from said bonding roller to the center position of said apparatus antenna along said transport direction.

5. The tag label producing apparatus according to claim 3, wherein:

said printing device performs desired printing, on said tag tape, said feeding roller includes:

a pressure roller that presses said tag, tape against said printing device; and an intermediate feeding roller located downstream from said pressure roller in said transport direction with respect to said feeding path, said nearest roller is said intermediate feeding roller, said control portion performs control such that said information transmission/reception is performed when said tag tape is fed such that said IC circuit part is transported downstream in said transport direction from a segment from said intermediate feeding roller to the center position of said apparatus antenna along said transport direction.

6. The tag label producing apparatus according to claim 4, further comprising a driving shaft that drives a driving roller disposed opposing said bonding roller or an intermediate feeding roller across the tape feeding path.

7. The tag label producing apparatus according to claim 3, wherein:

said printing device performs desired printing on said tag tape, said feeding roller includes a pressure roller that presses said tag tape against said printing device, said nearest roller is said pressure roller, and said control portion performs control such that said information transmission/reception is performed when said tag tape is fed such that said IC circuit part is transported downstream in said transport direction from a segment from said pressure roller to the center position of said apparatus antenna along said transport direction.

8. The tag label producing apparatus according to claim 3, wherein: said control portion controls in coordination said feeding roller, said printing device, and said apparatus antenna, such that information transmission/reception is performed after stopping the feeding of said tag tape is fed such that said IC circuit part is transported downstream in said transport direction from said segment from said nearest roller to said center position of said apparatus antenna along said transport direction.

9. The tag label producing apparatus according to claim 3, wherein:

at least one of said feeding roller is a roller with a step, said roller with a step including a contacting part that comes in contact with said RFID circuit element of said tag tape, said contacting part having a shape with greater recess than other parts.

* * * * *